US012797716B2

(12) United States Patent
Lu et al.

(10) Patent No.: US 12,797,716 B2
(45) Date of Patent: Nov. 17, 2026

(54) GAME CONTROLLER

(71) Applicant: DEXIN CORP., New Taipei City (TW)

(72) Inventors: Ho Lung Lu, New Taipei City (TW); Hung-Yi Fan, New Taipei City (TW)

(73) Assignee: DEXIN CORP., New Taipei City (TW)

( * ) Notice: Subject to any disclaimer, the term of this patent is extended or adjusted under 35 U.S.C. 154(b) by 253 days.

(21) Appl. No.: 18/518,305

(22) Filed: Nov. 22, 2023

(65) Prior Publication Data

US 2024/0165503 A1 May 23, 2024

Related U.S. Application Data

(60) Provisional application No. 63/427,689, filed on Nov. 23, 2022.

(30) Foreign Application Priority Data

Nov. 10, 2023 (TW) ................................ 112143407

(51) Int. Cl.
*A63F 13/24* (2014.01)

(52) U.S. Cl.
CPC .................................... *A63F 13/24* (2014.09)

(58) Field of Classification Search
CPC .......... A63F 13/24; A63F 13/98; A63F 13/23; A63F 13/92
See application file for complete search history.

(56) References Cited

U.S. PATENT DOCUMENTS

2012/0088582 A1* 4/2012 Wu ..................... A63F 13/5255 463/37
2013/0341214 A1* 12/2013 King ....................... A63F 13/98 206/216
2015/0273325 A1* 10/2015 Falc ........................ A63F 13/24 463/37
2015/0281422 A1* 10/2015 Kessler ................ H04M 11/007 455/557
2017/0056762 A1* 3/2017 Gafni .................... A63F 13/235
2017/0182410 A1* 6/2017 Townley ............. G06F 13/4027
2018/0133594 A1* 5/2018 Guo ....................... A63F 13/245
2019/0070886 A1* 3/2019 Nelson ................... B65D 77/20
2020/0155928 A1* 5/2020 Guo ......................... A63F 13/98
2020/0282309 A1* 9/2020 Liao ........................ A63F 13/92
2021/0275907 A1* 9/2021 Khaira .................... A63F 13/24
(Continued)

*Primary Examiner* — James B Hull
*Assistant Examiner* — Shauna-Kay N Hall
(74) *Attorney, Agent, or Firm* — Maschoff Brennan

(57) ABSTRACT

A game controller includes a first control handle, a second control handle and a stretchable assembly. The stretchable assembly is in a symmetrical configuration and is connected to the first control handle and the second control handle, the first control handle and the second control handle are slidable relative to each other via the stretchable assembly so as to be in a combined mode or a separated mode. When the game controller is in the combined mode, the first control handle and the second control handle are jointed with each other for being cooperated with a game console. When the game controller is in the separated mode, the first control handle and the second control handle are spaced apart from each other so as to form an installation space between the first control handle and the second control handle for a mobile device to be installed therein.

7 Claims, 8 Drawing Sheets

(56) References Cited

U.S. PATENT DOCUMENTS

| | | | | |
|---|---|---|---|---|
| 2022/0032178 | A1* | 2/2022 | Khaira | A63F 13/23 |
| 2022/0032179 | A1* | 2/2022 | Khaira | A63F 13/23 |
| 2022/0032180 | A1* | 2/2022 | Khaira | A63F 13/92 |
| 2022/0331688 | A1* | 10/2022 | Khaira | A63F 13/235 |
| 2023/0105244 | A1* | 4/2023 | Lu | A63F 13/24<br>463/37 |

* cited by examiner

GAME CONTROLLER

CROSS-REFERENCE TO RELATED APPLICATIONS

This non-provisional application claims priority under 35 U.S.C. § 119(a) on provisional patent application No(s). 63/427,689 filed in U.S.A. on Nov. 23, 2022, and on patent application No(s). 112143407 filed in Taiwan, R.O.C. on Nov. 10, 2023, the entire contents of which are hereby incorporated by reference.

TECHNICAL FIELD

The disclosure relates to a game controller, more particularly to a game controller suitable for a mobile device and a video game console.

BACKGROUND

With the popularity of mobile phones with touch screens (e.g., iPhone and Android phones), the game market for mobile phones has also expanded rapidly, and the revenue of mobile games has even surpassed the total revenue of video games and PC games.

At present, a game controller that can be used for TV game consoles and for mobile phones has been produced on the market. The game controller is equipped with a stretchable mechanism, so that when the user wants to play mobile games, the user can pull the game controller outwards for a mobile phone to be placed therein, so that the user can play mobile games via the game controller. However, the stretchable mechanism in the game controller lacks an appealing appearance, and the stretchable mechanism will be exposed to outside when the game controller is pulled outwards, which may reduce the aesthetics of the game controller and thus reduce appeal of the game controller to consumers. Therefore, how to address the aforementioned issue is one of the crucial topics in this field.

SUMMARY

The disclosure provides a game controller which has an aesthetic appearance even when the stretchable mechanism is exposed to outside.

One embodiment of the disclosure provides a game controller. The game controller is adapted to be cooperated with a game console or a mobile device. The game controller includes a first control handle, a second control handle and a stretchable assembly. The stretchable assembly is in a symmetrical configuration and is connected to the first control handle and the second control handle, the first control handle and the second control handle are slidable relative to each other via the stretchable assembly so as to be in a combined mode or a separated mode. When the game controller is in the combined mode, the first control handle and the second control handle are jointed with each other for being cooperated with the game console. When the game controller is in the separated mode, the first control handle and the second control handle are spaced apart from each other so as to form an installation space between the first control handle and the second control handle for the mobile device to be installed therein.

According to the game controller as discussed in the above embodiment, the stretchable assembly connected to the first control handle and the second control handle is in the symmetrical configuration. Even though the stretchable assembly is exposed to outside when the game controller is in the separated mode, the symmetrical stretchable assembly enhances the aesthetic appearance of the entire game controller, thereby improving the appeal of the game controller to consumers.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
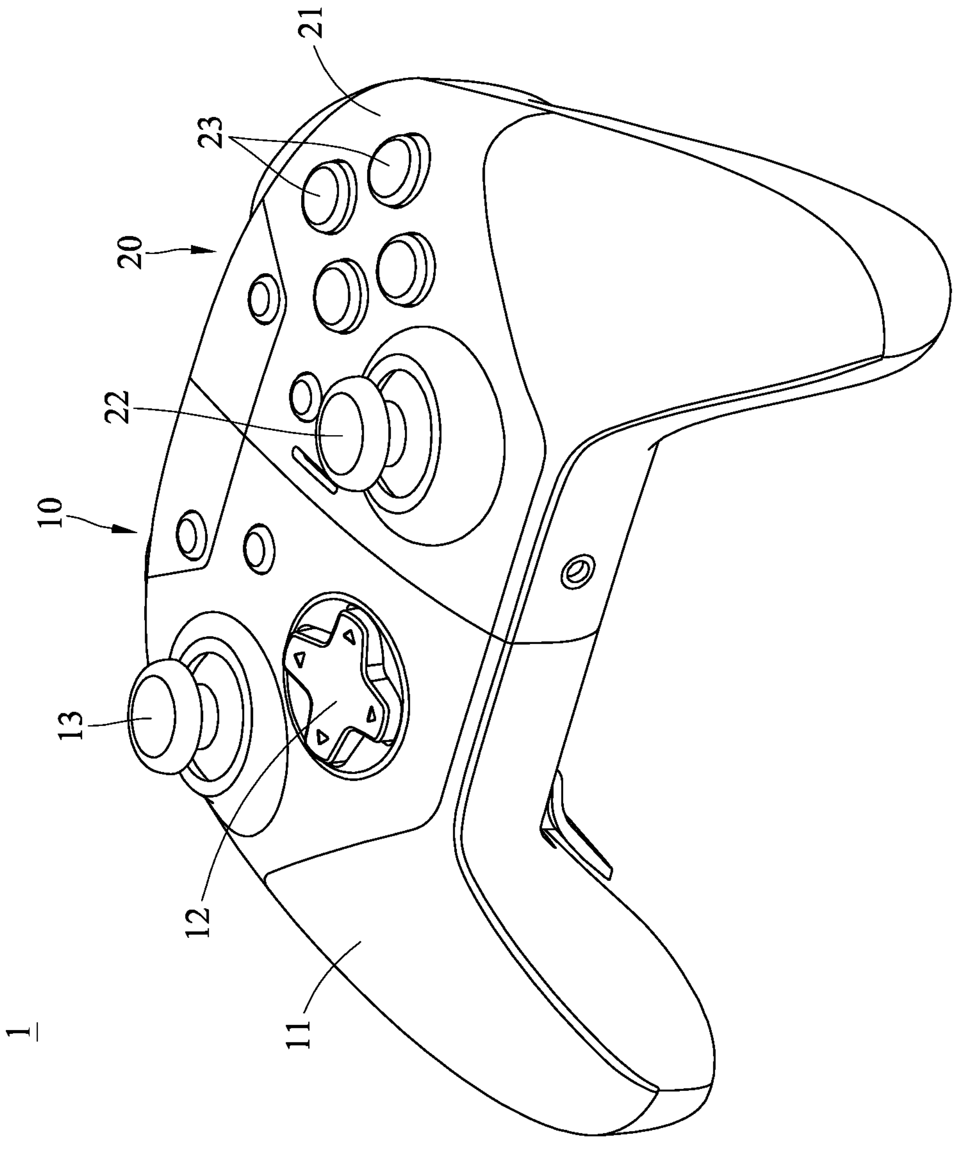
FIG. 1 is a perspective view of a game controller according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
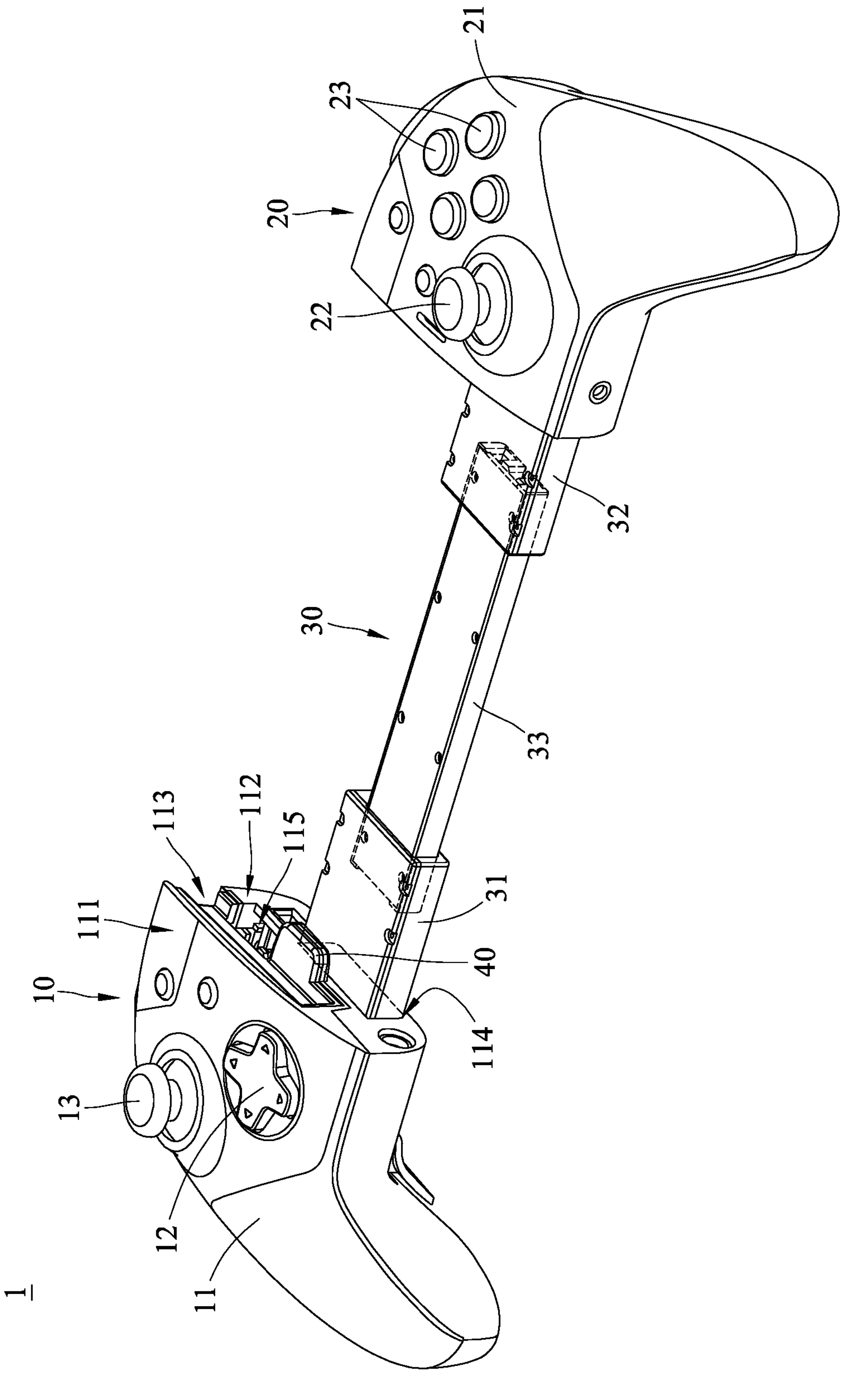
FIG. 2 is a perspective view of the game controller of FIG. 1 in a separated mode.

Referring to FIGS. 1 and 2, FIG. 1 is a perspective view of a game controller 1 according to one embodiment of the disclosure, and FIG. 2 is a perspective view of the game controller 1 of FIG. 1 in a separated mode.

Figure 5:
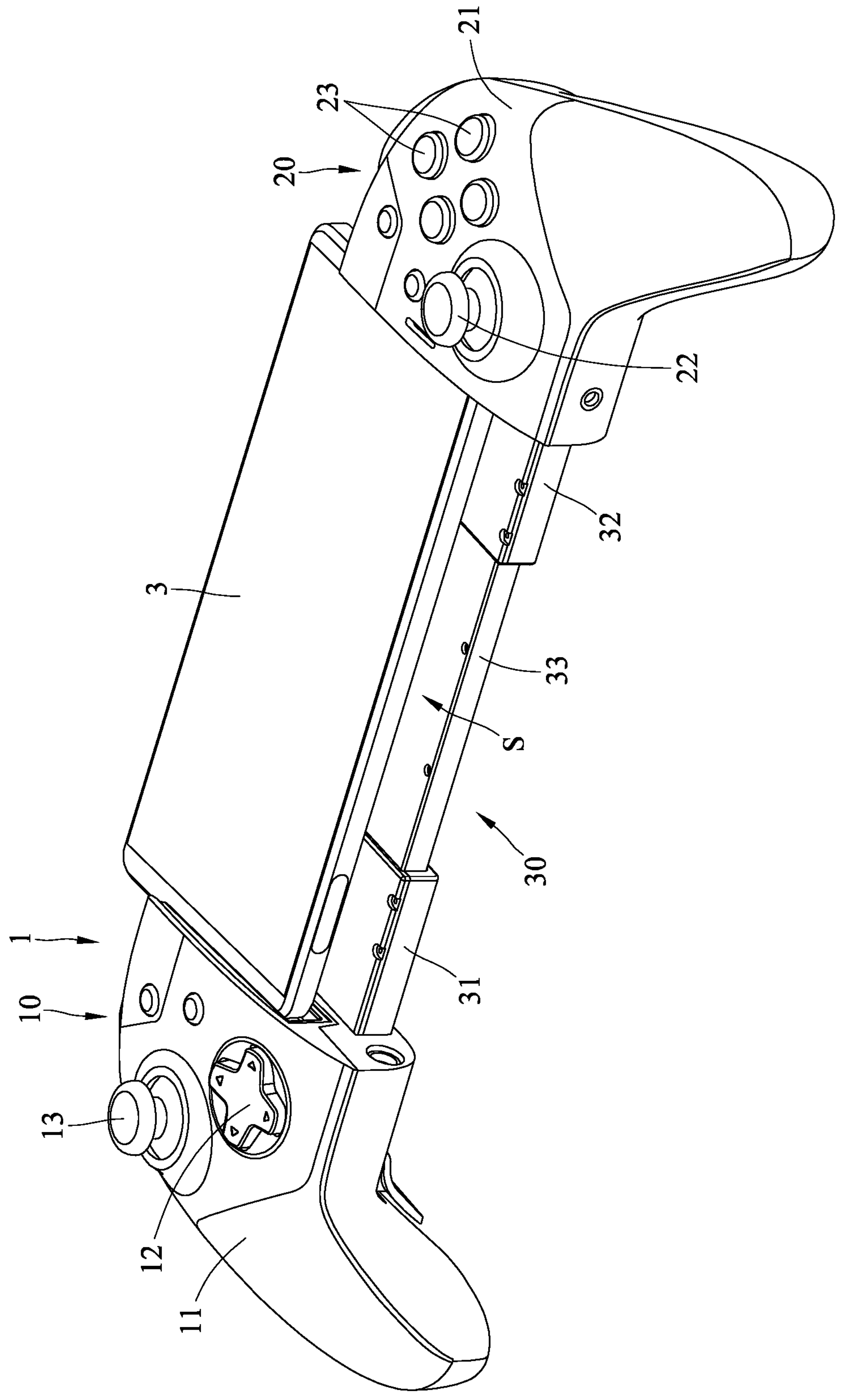
FIG. 5 is a perspective view of the game controller of FIG. 1 when being in the separated mode and cooperated with a mobile device.

In this embodiment, the game controller 1 is adapted to be cooperated with a game console 2 (e.g., shown in FIG. 7) or a mobile device 3 (e.g., shown in FIG. 5). The game console 2 is, for example, an Xbox or a PS5 video game console. The mobile device 3 is, for example, a smart phone or a tablet computer which is in iOS or android system.

The game controller 1 includes a first control handle 10, a second control handle and a stretchable assembly 30. The stretchable assembly 30 is in a symmetrical configuration and is connected to the first control handle 10 and the second control handle 20. The first control handle 10 and the second control handle 20 are slidable relative to each other via the stretchable assembly 30 so as to be in a separated mode (e.g., shown in FIG. 1) or a combined mode (e.g., shown in FIG. 1). The following paragraphs will provide further details on the first control handle 10, the second control handle 20 and the stretchable assembly 30.

Figure 3:
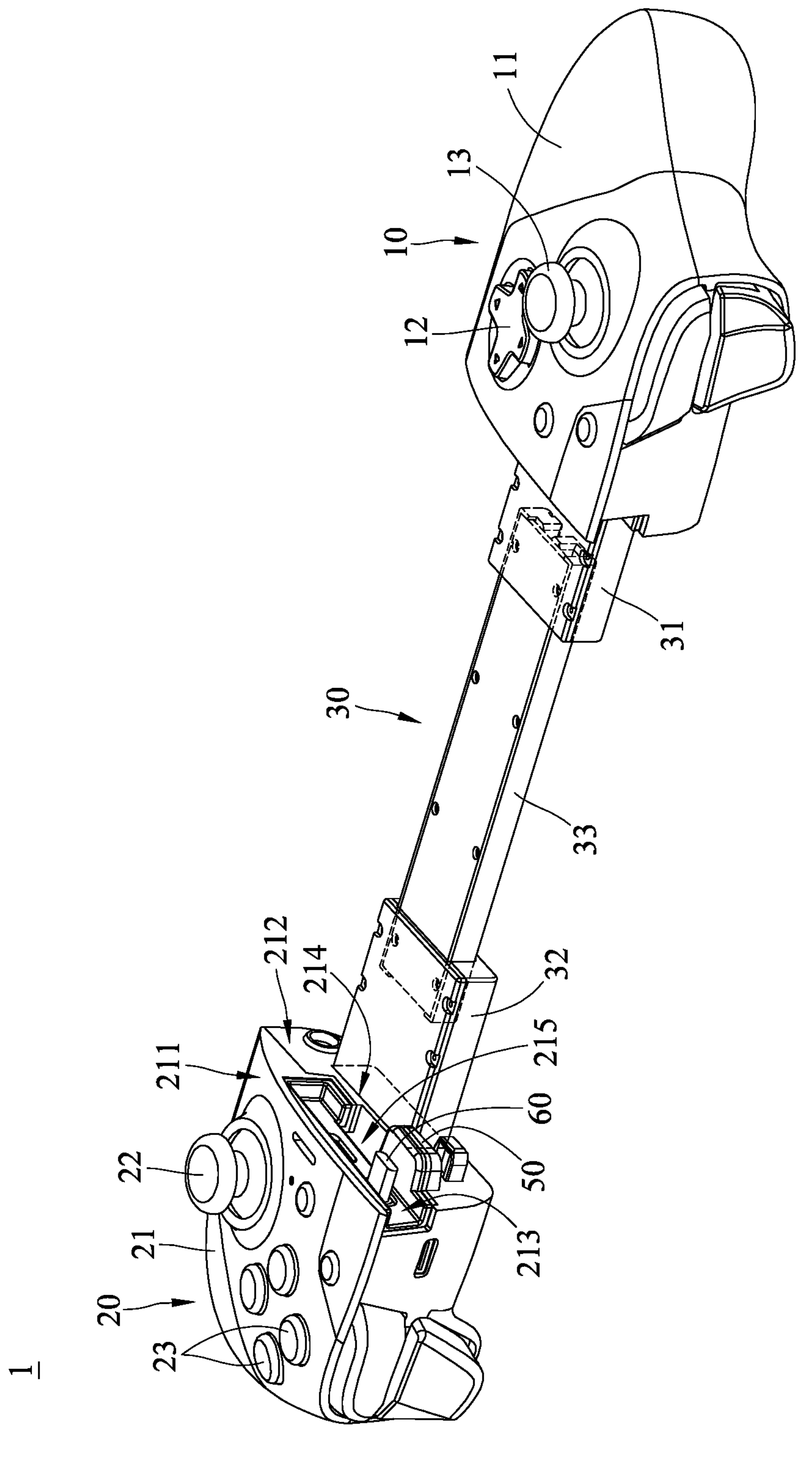
FIG. 3 is another perspective view of the game controller of FIG. 1 in the separated mode.
Figure 4:
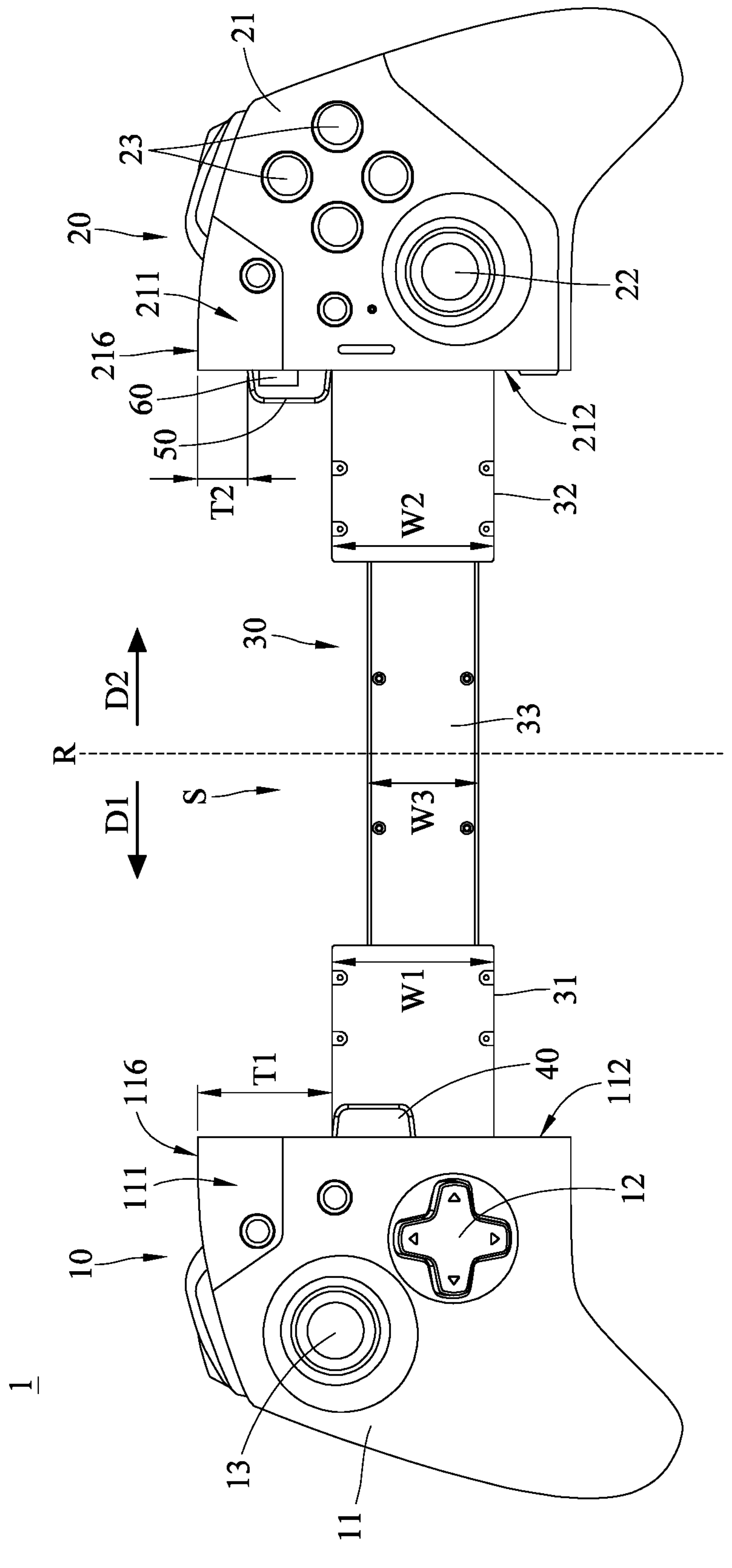
FIG. 4 is a top view of the game controller of FIG. 1 in the separated mode.

Then, referring to FIGS. 2 to 4, FIG. 3 is another perspective view of the game controller 1 of FIG. 1 in the separated mode, and FIG. 4 is a top view of the game controller 1 of FIG. 1 in the separated mode.

The first control handle 10 includes a first casing 11, a direction pad 12 and a first stick 13. The first casing 11 has a first top surface 111, a first contact surface 112, a first positioning groove 113, a first accommodation space 114 and a first insertion slot 115. The first contact surface 112 and the first top surface 111 are connected to each other and respectively face different directions. The first positioning groove 113, the first accommodation space 114 and the first insertion slot 115 are recessed at different positions on the first contact surface 112, respectively. The direction pad 12 and the first stick 13 are disposed on the first top surface 111 of the first casing 11 for being operated by a user.

The second control handle 20 includes a second casing 21, a second stick 22 and a plurality of functional buttons 23. The second casing 21 has a second top surface 211, a second contact surface 212, a second positioning groove 213, a second accommodation space 214 and a second insertion slot 215. The second contact surface 212 and the second top surface 211 are connected to each other and respectively face different directions, and the second contact surface 212 faces the first contact surface 112 of the first control handle 10. The second positioning groove 213, the second accommodation space 214 and the second insertion slot 215 are recessed at different positions on the second contact surface 212. The second stick 22 and the functional buttons 23 are disposed on the second top surface 211 of the second casing 21 for being operated by the user.

The stretchable assembly 30 includes a first rail 31, a second rail 32 and a third rail 33. A width W1 of the first rail 31 and a width W2 of the second rail 32 are, for example, equal to each other, and a width W3 of the third rail 33 is, for example, smaller than the width W1 of the first rail 31 and the width W2 of the second rail 32. The first rail 31 is slidably disposed at the first accommodation space 114 of the first casing 11 of the first control handle 10, and the first rail 31 can be entirely accommodated in the first accommodation space 114 or at least partially located outside the first accommodation space 114 of the first casing 11. The second rail 32 is slidably disposed at the second accommodation space 214 of the second casing 21 of the second control handle 20, and the second rail 32 can be entirely accommodated in the second accommodation space 214 of the second casing 21 or at least partially located outside the second accommodation space 214 of the second casing 21. The third rail 33 is slidably connected to the first rail 31 and the second rail 32, and the third rail 33 can be entirely accommodated in the first rail 31 and the second rail 32 or at least partially located outside the first rail 31 and the second rail 32.

Note that in the stretchable assembly 30, the width W1 of the first rail 31 and the width W2 of the second rail 32 are not restricted to being greater than the width W3 of the third rail 33; in some other embodiments, the widths of the first rail and the second rail may be smaller than the width of the third rail.

In this embodiment, the game controller 1 may further include a first support structure 40 and a second support structure 50. The first support structure 40 and the second support structure 50 are, for example, protrusions. The first support structure 40 protrudes from the first contact surface 112 of the first casing 11 of the first control handle 10. The second support structure 50 protrudes from the second contact surface 212 of the second casing 21 of the second control handle 20. In a direction D1 or D2 that the first control handle and the second control handle 20 are slidable relative to each other, the first support structure 40 and the second support structure 50 are arranged offset from each other. For example, the first casing 11 of the first control handle 10 has a front side 116, and the second casing 21 of the second control handle 20 has a front side 216. The front side 116 of the first control handle 10 and the front side 216 of the second control handle 20 are flush with each other. A distance T1 from the first support structure 40 to the front side 116 of the first control handle 10 is greater than a distance T2 from the second support structure 50 to the front side 216 of the second control handle 20.

In this embodiment, the game controller 1 may further include a signal connector 60. The signal connector 60 is, for example, a Lightning or Type C connector, and is disposed on the second casing 21 of the second control handle 20. The signal connector 60 extends from the second positioning groove 213 of the second casing 21 and sticks out of the second contact surface 212. The signal connector 60 is located closer to the second top surface 211 than the second support structure 50, and a projection of the signal connector 60 along a direction parallel to a normal line of the second top surface 211 is overlapped with the second support structure 50. In other words, when the game controller 1 is viewed from a direction towards the second top surface 211 of the second casing 21 in FIG. 4, the signal connector 60 is overlapped with the second support structure 50; that is, the signal connector 60 is located right above the second support structure 50, but the disclosure is not limited thereto; in some other embodiments, the signal connector may not be located right above the second support structure but obliquely positioned above the second support structure. In addition, the signal connector 60 is located closer to the front side 116 of the first casing 11 of the first control handle 10 and the front side 216 of the second casing 21 of the second control handle than the stretchable assembly 30.

Figure 6:
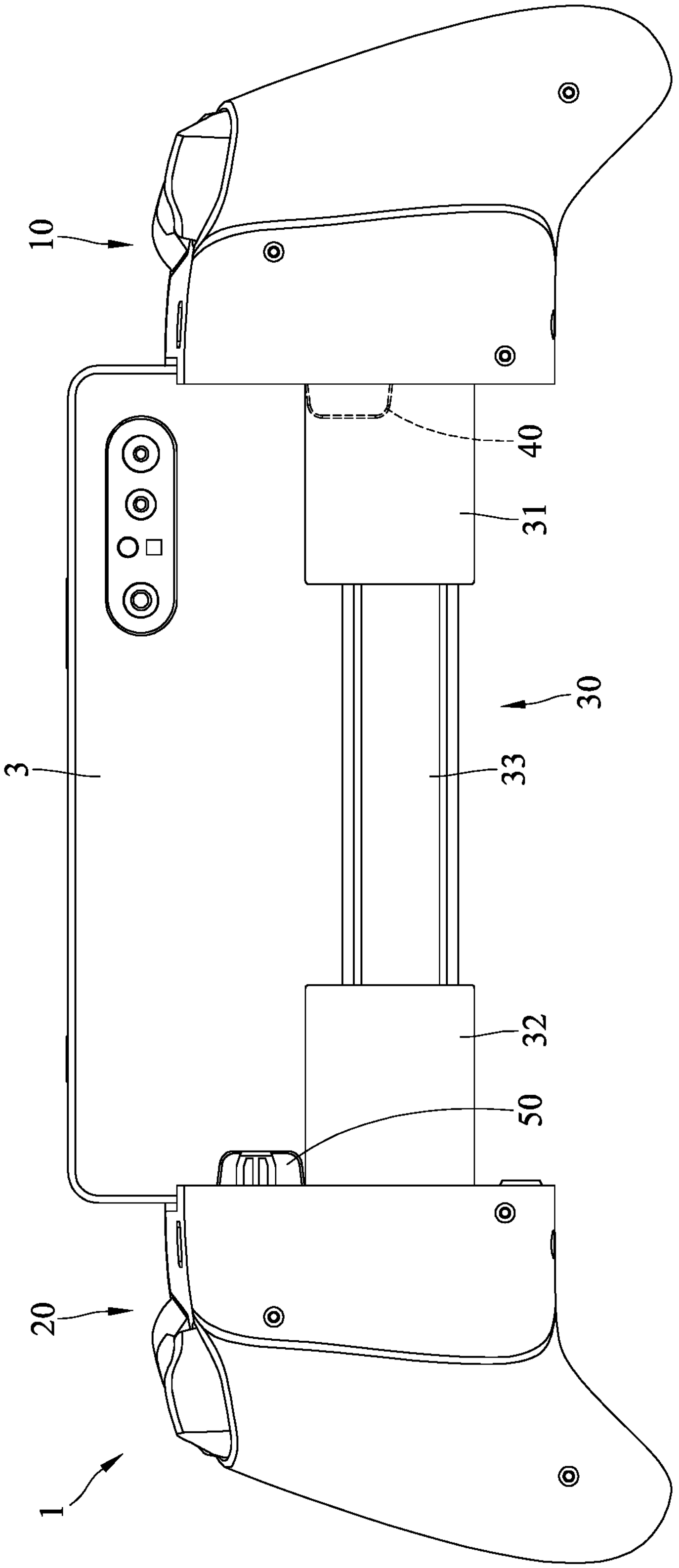
FIG. 6 is a bottom view of the game controller of FIG. 1 when being in the separated mode and cooperated with the mobile device.

Then, referring to FIGS. 4 to 6, FIG. 4 is a top view of the game controller 1 of FIG. 1 in the separated mode, FIG. 5 is a perspective view of the game controller 1 of FIG. 1 when being in the separated mode and cooperated with the mobile device 3, and FIG. 6 is a bottom view of the game controller 1 of FIG. 1 when being in the separated mode and cooperated with the mobile device 3.

When the game controller 1 is in the separated mode, the first contact surface 112 of the first control handle 10 and the second contact surface 212 of the second control handle are spaced apart from each other so as to form an installation space S between the first control handle 10 and the second control handle 20, the first rail 31 and the second rail 32 are at least partially located outside the first control handle 10 and the second control handle 20, respectively, and the third rail 33 is at least partially located outside the first rail 31 and the second rail 32, and the stretchable assembly 30 is in a symmetrical configuration relative to a reference plane R, which is centrally located between the first contact surface 112 and the second contact surface 212; that is, the first rail 31 and the second rail 32 are arranged symmetrical to each other relative to the third rail 33 with reference to the reference plane R. At this moment, the user can install the mobile device 3 into the installation space S, and the mobile device 3 is positioned in the first positioning groove 113 of the first control handle (shown in FIG. 2) and the second positioning groove 213 of the second control handle 20 (shown in FIG. 3). After the mobile device 3 is installed in the installation space S, the signal connector 60 is inserted into the mobile device 3, and a rear side of the mobile device 3 is supported by the first support structure 40 and the second support structure 50.

In this embodiment, the stretchable assembly 30 connected to the first control handle 10 and the second control handle 20 is in the symmetrical configuration. Even though the stretchable assembly 30 is exposed to outside when the game controller 1 is in the separated mode, the symmetrical stretchable assembly 30 enhances the aesthetic appearance of the entire game controller 1, thereby improving the appeal of the game controller 1 to consumers.

In addition, in the separated mode of the game controller 1, the symmetrical stretchable assembly 30 helps position the gravity center of the game controller 1 as close to the geometric center thereof as possible, such that the user can hold the game controller 1 more comfortably while playing games on the mobile device 3.

In this embodiment, the stretchable assembly 30 is implemented as three pieces of rails, but the disclosure is not limited thereto. The quantity of the rails of the stretchable assembly may be modified according to actual requirements as long as the stretchable assembly is maintained to be the symmetrical configuration.

Moreover, the signal connector 60 is located closer to the front side 116 of the first casing 11 of the first control handle 10 and the front side 216 of the second casing 21 of the second control handle 20 than the stretchable assembly 30. As a result, when the mobile device 3 is mounted into the installation space S and is inserted by the signal connector 60, cameras of the mobile device 3 may be prevented from being blocked by the stretchable assembly 30. Therefore, the user can use the game controller 1 to experience camera-dependent games on the mobile device 3, such as AR mobile games.

Note that the signal connector 60 is not restricted to being disposed on the second control handle 20 and may be modified to be disposed on the first control handle in some other embodiments. In addition, the signal connector 60 may be an optional component. In some other embodiments, the signal connector may be omitted, and the mobile device installed in the installation space may wirelessly communicate with the game controller.

On the other hand, the first positioning groove 113 of the first control handle 10 and the second positioning groove 213 of the second control handle 20 are optional structures and may be omitted in some other embodiments. In such a case, the mobile device may be positioned by the first contact surface of the first control handle and the second contact surface of the second control handle.

Figure 7:
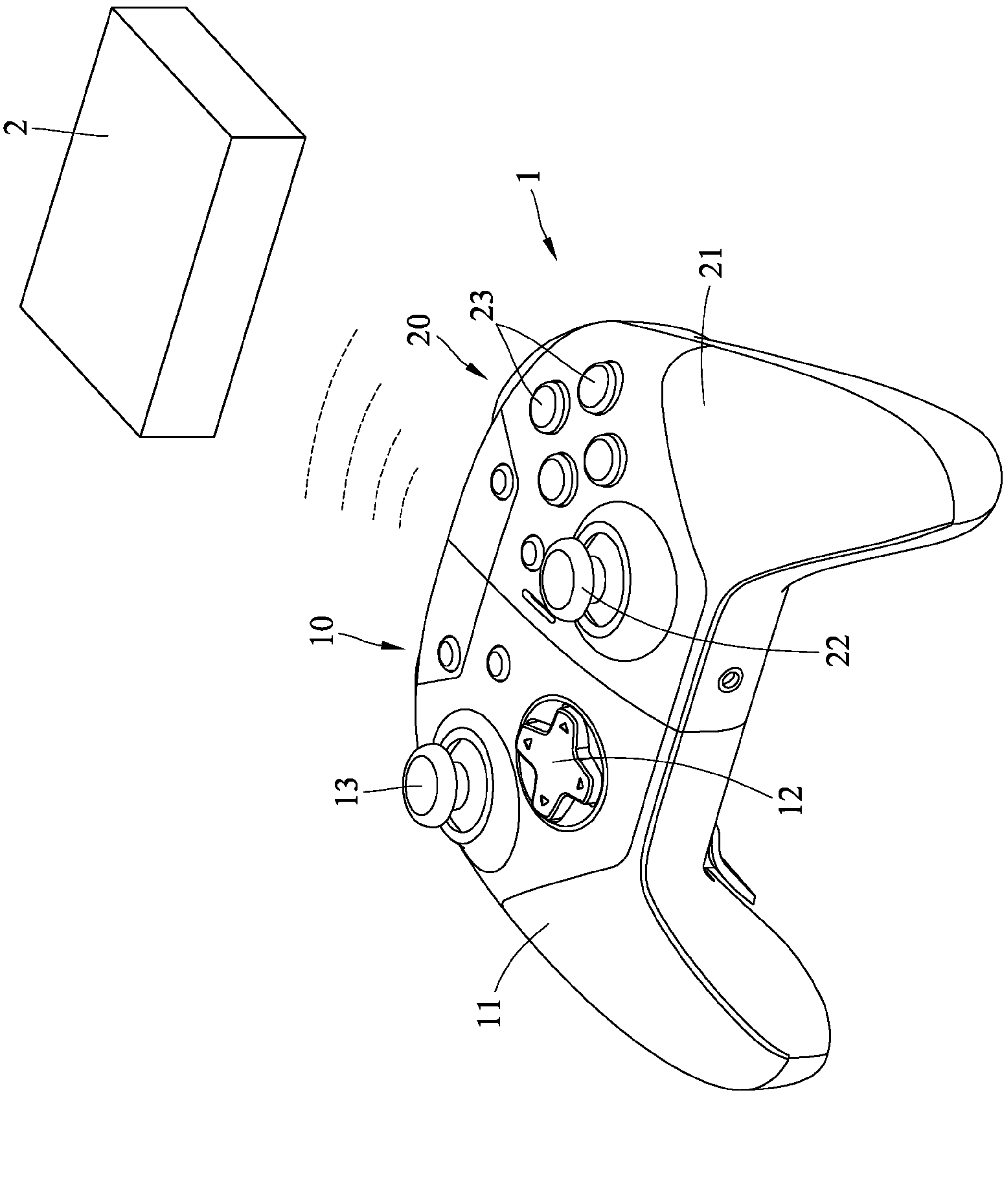
FIG. 7 is a perspective view of the game controller of FIG. 1 when being in a combined mode and cooperated with a game console.
Figure 8:
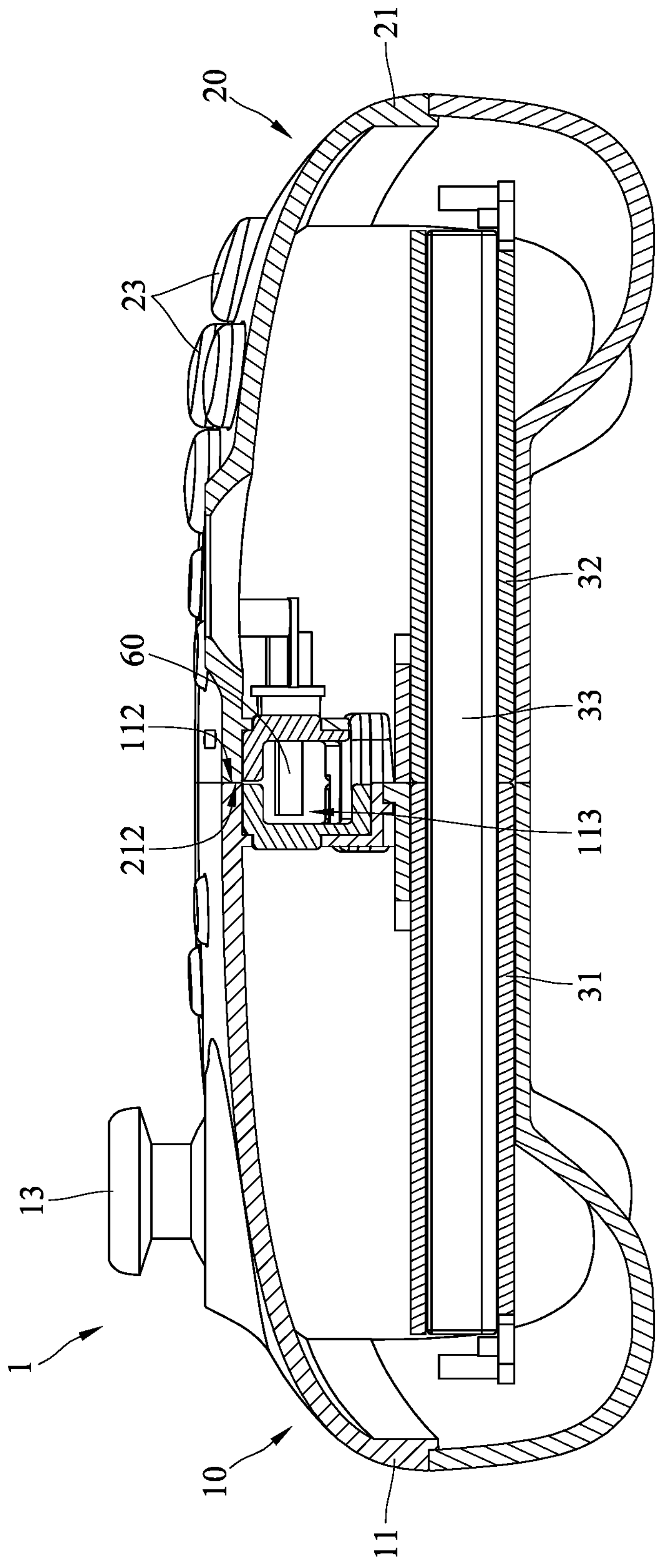
FIG. 8 is a cross-sectional view of the game controller of FIG. 7 in the combined mode.

Then, referring to FIGS. 7 and 8, FIG. 7 is a perspective view of the game controller 1 of FIG. 1 when being in a combined mode and cooperated with the game console 2, and FIG. 8 is a cross-sectional view of the game controller 1 of FIG. 7 in the combined mode.

When the user wants use the game controller 1 to experience games on the game console 2, the user can switch the game controller 1 to be in a combined mode. When the game controller 1 is in the combined mode, the first control handle 10 and the second control handle 20 are jointed with each other. Specifically, the first contact surface 112 of the first control handle 10 is in contact with the second contact surface 212 of the second control handle 20, the first rail 31 and the second rail 32 are respectively accommodated in the first control handle 10 and the second control handle 20, a half of the third rail 33 is accommodated in the first rail 31, other half of the third rail 33 is accommodated in the second rail 32, the first rail 31 and the second rail 32 are in the symmetrical configuration relative to the third rail 33, the first support structure 40 is inserted into the second insertion slot 215 (shown in FIGS. 2 and 3) of the second control handle 20, the second support structure 50 is inserted into the first insertion slot 115 (shown in FIGS. 2 and 3) of the first control handle 10, and the signal connector 60 is accommodated in the first positioning groove 113 of the first control handle 10. At this moment, the overall shape of the game controller 1 in the combined mode is substantially the same as that of a genuine game controller of the game console 2. Therefore, the user can experience games with the tactile feedback similar to that of the genuine game controller of the game console 2.

In this embodiment, the game controller 1 in the combined mode can communicate with the game console 2 via a wireless or wire manner. For example, in one embodiment, a switch (not shown) may be further provided in the first positioning groove 113 of the first control handle 10. When the game controller 1 is in the combined mode, the signal connector 60 is accommodated in the first positioning groove 113 of the first control handle 10 and thus activate the switch, such that a wireless transceiver (not shown) in the game controller 1 may communicate with the game console 2 via wireless signals. Alternatively, in another embodiment, an ejection mechanism (not shown) and a joint (e.g., a USB joint, not shown) may be provided on the game controller 1. When the game controller 1 is in the combined mode, the signal connector 60 is accommodated in the first positioning groove 113 of the first control handle 10 so as to activate the ejection mechanism for ejecting the joint, such that a cable can connect the joint and the game console 2 for enabling a wire communication between the game controller 1 and the game console 2.

In this embodiment, when the game controller 1 is in the combined mode, the first rail 31 and the second rail 32 are in the symmetrical configuration relative to the third rail 33, which can help position the gravity center of the game controller 1 as close to the geometric center thereof as possible, such that the user can hold the game controller 1 more comfortably while playing games on the game console 2.

Note that the first rail 31 and the second rail 32 are not restricted to being in the symmetrical configuration relative to the third rail 33 when the game controller 1 is in the combined mode. In some other embodiments, when the game controller is in the combined mode, the first rail and the second rail may be in an asymmetric configuration relative to the third rail.

In this embodiment, when the game controller 1 is in the combined mode, the first insertion slot 115 of the first control handle 10 and the second insertion slot 215 of the second control handle 20 respectively accommodate the second support structure 50 and the first support structure 40 arranged offset from each other, such that the first contact surface 112 of the first control handle 10 and the second contact surface 212 of the second control handle contact each other evenly.

Note that the first support structure 40 and the second support structure 50 are not restricted to being offset from each other. In some other embodiments, the first support structure and the second support structure may be jagged structures, and the first support structure and the second support structure may be aligned with each other in a direction that the first control handle and the second control handle are movable relative to each other, such that the first support structure and the second support structure may be meshed with each other when the game controller 1 is in the combined mode.

On the other hand, the first support structure 40 and the second support structure 50 are optional structures. In some other embodiments, the game controller may not include the first support structure and the second support structure, and the first control handle and the second control handle may not respectively have the first insertion slot and the second insertion slot correspondingly.

In one embodiment, an elastic component (not shown) may be provided in the game controller, and the elastic component may extend from inside of the first control handle to inside of the second control handle 20 through inside of the stretchable assembly 30. The elastic component is configured to force the first control handle 10 and the second control handle 20 to move towards each other. When the mobile device 3 is removed from the game controller 1 in the separated mode, the elastic component can force the first control handle and the second control handle 20 to move towards each other, thereby switching the game controller 1 to the combined mode.

According to the game controller as discussed in the above embodiment, the stretchable assembly connected to the first control handle and the second control handle is in the symmetrical configuration. Even though the stretchable assembly is exposed to outside when the game controller is in the separated mode, the symmetrical stretchable assembly enhances the aesthetic appearance of the entire game controller, thereby improving the appeal of the game controller to consumers.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A game controller, adapted to be cooperated with a game console or a mobile device, the game controller comprising:

a first control handle;

a second control handle; and a stretchable assembly, wherein the stretchable assembly is in a symmetrical configuration and is connected to the first control handle and the second control handle, the first control handle and the second control handle are slidable relative to each other via the stretchable assembly so as to be in a combined mode or a separated mode;

wherein when the game controller is in the combined mode, the first control handle and the second control handle are jointed with each other for being cooperated with the game console; when the game controller is in the separated mode, the first control handle and the second control handle are spaced apart from each other so as to form an installation space between the first control handle and the second control handle for the mobile device to be installed therein;

wherein the game controller further comprises a first support structure and a second support structure, wherein the first support structure and the second support structure are respectively disposed on the first control handle and the second control handle, and the first support structure and the second support structure are configured to support a rear side of the mobile device when the game controller is in the separated mode;

wherein in a direction that the first control handle and the second control handle are slidable relative to each other, the first support structure and the second support structure are arranged offset from each other;

wherein the first control handle has a first top surface and a first contact surface, the second control handle has a second top surface and a second contact surface, the second top surface and the first top surface face a same direction, the first contact surface and the second contact surface face each other, the first support structure protrudes from the first contact surface and is spaced apart from the first top surface of the first control handle by a distance, and the second support structure protrudes from the second contact surface and is spaced apart from the second top surface of the second control handle by a distance;

wherein the first control handle has a first insertion slot, the second control handle has a second insertion slot; when the game controller is in the combined mode, the first support structure is inserted into the second insertion slot of the second control handle, and the second support structure is inserted into the first insertion slot of the first control handle.

2. The game controller according to claim 1, wherein the first contact surface of the first control handle faces the second contact surface of the second control handle; when the game controller is in the combined mode, the first contact surface of the first control handle is in contact with the second contact surface of the second control handle; when the game controller is in the separated mode, the first contact surface of the first control handle is spaced apart from the second contact surface of the second control handle, and the stretchable assembly is in the symmetrical configuration relative to a reference plane, which is centrally located between the first contact surface of the first control handle and the second contact surface of the second control handle.

3. The game controller according to claim 1, wherein the stretchable assembly comprises a first rail, a second rail and a third rail, the first rail is slidably disposed on the first control handle, the second rail is slidably disposed on the second control handle, the third rail is slidably connected to the first rail and the second rail, and the first rail and the second rail are arranged symmetrical to each other relative to the third rail.

4. The game controller according to claim 3, wherein when the game controller is in the combined mode, the first rail and the second rail are respectively accommodated in the first control handle and the second control handle, and the third rail is accommodated in the first rail and the second rail; when the game controller is in the separated mode, the first rail and the second rail are at least partially located outside the first control handle and the second control handle, respectively, and the third rail is at least partially located outside the first rail and the second rail.

5. The game controller according to claim 4, wherein a width of the third rail is smaller than a width of the first rail and a width of the second rail.

6. The game controller according to claim 1, further comprising a signal connector, wherein the signal connector is disposed on the second control handle, the signal connector is configured to be inserted into the mobile device when the game controller is in the separated mode, each of the first control handle and the second control handle has a front side, the front side of the first control handle is flush with the front side of the second control handle, a distance from the first support structure to the front side of the first control handle is greater than a distance from the second support structure to the front side of the second control handle.

7. The game controller according to claim 6, wherein the second contact surface and the second top surface face different directions and are connected to each other, the second contact surface faces the first control handle, the signal connector and the second support structure protrude from the second contact surface, the signal connector is located closer to the second top surface than the second support structure, and a projection of the signal connector along a direction parallel to a normal line of the second top surface is overlapped with the second support structure.

* * * * *